US012055124B1

(12) United States Patent
Guo et al.

(10) Patent No.: US 12,055,124 B1
(45) Date of Patent: Aug. 6, 2024

(54) FOUR-QUADRANT RADIAL PISTON HYDRAULIC DEVICE AND WORKING METHOD THEREOF

(71) Applicant: HUAQIAO UNIVERSITY, Quanzhou (CN)

(72) Inventors: Tong Guo, Quanzhou (CN); Xiaomin Huang, Quanzhou (CN); Tao Luo, Quanzhou (CN); Tianliang Lin, Quanzhou (CN); Cheng Miao, Quanzhou (CN); Jianping Liu, Quanzhou (CN); Fumin Que, Quanzhou (CN)

(73) Assignee: HUAQIAO UNIVERSITY, Quanzhou (CN)

( * ) Notice: Subject to any disclaimer, the term of this patent is extended or adjusted under 35 U.S.C. 154(b) by 0 days.

(21) Appl. No.: 18/616,194

(22) Filed: Mar. 26, 2024

Related U.S. Application Data

(63) Continuation-in-part of application No. PCT/CN2023/111157, filed on Aug. 4, 2023.

(30) Foreign Application Priority Data

May 26, 2023 (CN) ......................... 202310601126.3

(51) Int. Cl.
*F03C 1/40* (2006.01)
*F03C 1/04* (2006.01)
(Continued)

(52) U.S. Cl.
CPC .............. *F03C 1/0447* (2013.01); *F03C 1/04* (2013.01); *F03C 1/053* (2013.01); *F04B 1/04* (2013.01);
(Continued)

(58) Field of Classification Search
CPC .......... F03C 1/04; F03C 1/0447; F03C 1/053; F04B 1/04; F04B 1/0452; F04B 1/053; F04B 1/06
See application file for complete search history.

(56) References Cited

U.S. PATENT DOCUMENTS 2,000,271 A * 5/1935 Benedek ............... F01B 1/0648 91/494
2,461,235 A * 2/1949 Raymond ............. F01B 1/0655 92/155
(Continued)

FOREIGN PATENT DOCUMENTS

CN 103742378 A 4/2014
CN 113266610 A 8/2021
(Continued)

OTHER PUBLICATIONS

International Search Report issued in corresponding International application No. PCT/CN2023/111157, mailed Dec. 13, 2023 (7 pages).
(Continued)

*Primary Examiner* — Dustin T Nguyen

(57) ABSTRACT

A four-quadrant radial piston hydraulic device includes a housing, plunger assemblies, an eccentric spindle rotatably disposed on the housing, pilot-operated check valves one-to-one corresponding to the plunger assemblies, two-way cartridge valves one-to-one corresponding to the plunger assemblies, a distribution shaft and a confluence plate. A reversing slide valve is disposed on the confluence plate. A working method of a four-quadrant radial piston hydraulic device is also provided. When the radial piston hydraulic device is used as a hydraulic motor and a hydraulic pump, it is capable of realizing two-way rotation, which solves a limitation of valve flow distribution in motor application.

9 Claims, 20 Drawing Sheets

(51) Int. Cl.

| | |
|---|---|
| ***F03C 1/053*** | (2006.01) |
| ***F04B 1/04*** | (2020.01) |
| ***F04B 1/0452*** | (2020.01) |
| ***F04B 1/053*** | (2020.01) |
| ***F04B 1/06*** | (2020.01) |
| *F04B 53/16* | (2006.01) |
| *F15B 15/14* | (2006.01) |

(52) U.S. Cl.
CPC ............ *F04B 1/0452* (2013.01); *F04B 1/053* (2013.01); *F04B 1/06* (2013.01); *F04B 53/16* (2013.01); *F15B 15/1447* (2013.01)

(56) References Cited

U.S. PATENT DOCUMENTS

| | | | | | |
|---|---|---|---|---|---|
| 3,682,572 | A * | 8/1972 | Yarger | F04B 49/18 | 417/454 |
| 3,985,065 | A * | 10/1976 | Nonnenmacher | F03C 1/0438 | 91/498 |
| 4,785,714 | A * | 11/1988 | Tamada | F04B 49/02 | 91/499 |
| 4,915,595 | A * | 4/1990 | Nelson | F04B 1/053 | 417/559 |
| 5,876,186 | A * | 3/1999 | Stiefel | F04B 1/0421 | 417/273 |

FOREIGN PATENT DOCUMENTS

| | | | |
|---|---|---|---|
| CN | 114412847 | A | 4/2022 |
| CN | 115898748 | A | 4/2023 |
| CN | 116146561 | A | 5/2023 |
| CN | 116378892 | A | 7/2023 |
| EP | 2873870 | A1 | 5/2015 |

OTHER PUBLICATIONS

Written Opinion of the International Search Authority in corresponding International application No. PCT/CN2023/111157, mailed Dec. 13, 2023 (9 pages).

* cited by examiner

A-A

H-H

K-K

FOUR-QUADRANT RADIAL PISTON HYDRAULIC DEVICE AND WORKING METHOD THEREOF

TECHNICAL FIELD

The present disclosure relates to a field of radial piston hydraulic device technology, and in particularly to a four-quadrant radial piston hydraulic device having two types of valves for flow distribution and a working method thereof.

BACKGROUND

A radial piston hydraulic device is an extremely important actuator in a hydraulic system, which is widely used in construction machinery, construction machinery, mining machinery, and other fields. Common commercial radial piston hydraulic devices include hydraulic motors and hydraulic pumps, which are characterized by low speed and high torque. A radial piston pump provides power to the hydraulic system by outputting oil with a certain pressure. A radial piston motor outputs a certain torque and speed to outside, making an actuator to do work on the outside. Performance of the hydraulic motors and the hydraulic pumps directly affects performance of hydraulic systems.

There are three main flow distribution methods of the radial piston hydraulic device: shaft distribution method, end face distribution method, and valve distribution method. Both the shaft distribution method and the end face distribution method enable the radial piston hydraulic device to switch between a pump state and a motor state. When a torque is input, the radial piston hydraulic device works in the pump state, and outputs fluid with high pressure to outside. When a high-pressure fluid is input, the radial piston hydraulic device works in the motor state, and at this time, the radial piston hydraulic device outputs torque and speed to the outside. However, there are inevitable clearances in the radial piston hydraulic device with these two distribution methods, wear caused by the working process cannot be automatically compensated, resulting in a higher risk of leakage under high-pressure conditions, which limits the maximum working pressure of the radial piston hydraulic device.

The CN patent application No. CN115898748A discloses a radial piston hydraulic device and a working method for controlling flow distribution of two valves with a single group of oil-ways, but the application only realizes one-way rotation of a pump or a motor thereof, and cannot realize two-way rotation of the pump and the motor.

SUMMARY

The present disclosure provides a four-quadrant radial piston hydraulic device having two types of valves for flow distribution, where a structure thereof is simple, and operation is convenient. The present disclosure aims to solve a problem that the conventional radial piston hydraulic device can only realize the unidirectional rotation of the pump or the motor device and cannot realize the two-way rotation of the pump and the motor.

The present disclosure adopts the following scheme:

The present disclosure provides a four-quadrant radial piston hydraulic device having two types of valves for flow distribution. The four-quadrant radial piston hydraulic device having two types of valves for flow distribution includes a housing, plunger assemblies, an eccentric spindle rotatably disposed on the housing, pilot-operated check valves one-to-one corresponding to the plunger assemblies, and two-way cartridge valves one-to-one corresponding to the plunger assemblies.

The housing defines plunger cavities, an eccentric spindle cavity, pilot-operated check valve cavities, two-way cartridge valve cavities, high-pressure oil-ways, low-pressure oil-ways, and control oil-ways therein. The pilot-operated check valve cavities and the two-way cartridge valve cavities respectively one-to-one correspond to the plunger assemblies. Each of the plunger assemblies is slidably disposed in a corresponding plunger cavity along a vertical direction. The eccentric spindle is rotatably assembled in the eccentric spindle cavity, and is in transmission connection with the plunger assemblies.

The four-quadrant radial piston hydraulic device having two types of valves for flow distribution further comprises a distribution shaft and a confluence plate. The distribution shaft is inserted into the eccentric spindle, and a reversing slide valve is disposed on the confluence plate.

The distribution shaft defines a first distribution ring groove, a second distribution ring groove, and a third distribution ring groove thereon, all of which are communicated with a high-pressure main port or a low-pressure main port. The distribution shaft defines a first distribution semi-ring groove, a second distribution semi-ring groove, a first oil hole, and a second oil hole thereon. The first oil hole is communicated with the second distribution semi-ring groove and the second distribution ring groove. The second oil hole is communicated with the first distribution semi-ring groove, the first distribution ring groove, and the third distribution ring groove.

The confluence plate defines a high-pressure ring groove, a low-pressure ring groove, a reversing slide valve cavity, control oil-ways of the confluence plate, and the reversing slide valve thereon. The high-pressure ring groove defines a high-pressure ring groove hole thereon, and the low-pressure ring groove defines a low-pressure ring groove hole thereon. A first side of the reversing slide valve cavity is communicated with the high-pressure ring groove and the low-pressure ring groove respectively by the high-pressure ring groove hole and the low-pressure ring groove hole. A second side of the reversing slide valve cavity is communicated with the first distribution ring groove, the second distribution ring groove, and the third distribution ring groove. The reversing slide valve is inserted in the reversing slide valve cavity. The reversing slide valve is configured to enable the high-pressure ring groove to switch between being communicated with the first distribution ring groove and being communicated with the second distribution ring groove, and to enable the low-pressure ring groove to switch between being communicated with the second distribution ring groove and being communicated with the third distribution ring groove.

Each of the pilot-operated check valves is disposed in a corresponding pilot-operated check valve cavity. Each of the two-way cartridge valves is disposed in a corresponding two-way cartridge valve cavity. The pilot-operated check valves and the two-way cartridge valves are connected with the high-pressure oil-ways, the low-pressure oil-ways, and the control oil-ways of the housing. Each of the pilot-operated check valves comprises a first control oil cavity, a first high-pressure oil cavity, and a first low-pressure oil cavity. Each first high-pressure oil cavity is communicated with a corresponding plunger cavity. Each first low-pressure oil cavity is communicated with the low-pressure ring groove. Each first control oil cavity is alternately communicated with the first distribution semi-ring groove and the second distribution semi-ring groove. When each first control oil cavity and each first high-pressure oil cavity are subjected to high pressure simultaneously, each first high-pressure oil cavity is communicated with a corresponding first low-pressure oil cavity. Each of the two-way cartridge valves comprises a second control oil cavity, a second high-pressure oil cavity, and a second low-pressure oil cavity. Each second low-pressure oil cavity is communicated with a corresponding plunger cavity. Each second high-pressure oil cavity is communicated with the high-pressure ring groove. Each second control oil cavity is alternately communicated with the first distribution semi-ring groove and the second distribution semi-ring groove. When each second control oil cavity and each second high-pressure oil cavity are subjected to high pressure simultaneously, each second high-pressure oil cavity and each first low-pressure oil cavity are closed.

Furthermore, the reversing slide valve comprises a valve spool. A first stop block, a second stop block, and a third stop block are disposed on the valve spool. A communicating groove is defined between each two adjacent stop blocks, and each communicating groove is configured to enable the high-pressure ring groove to switch between being communicated with the first distribution ring groove and being communicated with the second distribution ring groove when the valve spool slides, and to enable the low-pressure ring groove to switch between being communicated with the second distribution ring groove and being communicated with the third distribution ring groove.

Furthermore, a limiting screw is disposed on a first end of the reversing slide valve close to a distribution shaft end cover, and the limiting screw is configured to stabilize the valve spool. A compression spring is disposed on a second end of the reversing slide valve, and the compression spring is connected with the valve spool.

Furthermore, each of the pilot-operated check valves comprises a first valve body and a second valve body, and each second valve body is disposed in a corresponding first valve body. Each first valve body defines a corresponding first control oil cavity therein. Each second valve body defines a first movable cavity, a corresponding first high-pressure oil cavity and a corresponding first low-pressure oil cavity therein. A first valve core is movably installed in each first movable cavity. The first valve core is configured to control on-offs between each first high-pressure oil cavity and the corresponding first low-pressure oil cavity.

Furthermore, each of the two-way cartridge valves comprises a third valve body, a fourth valve body, and a second valve core. A second high-pressure oil cavity and a second low-pressure oil cavity are disposed in each third valve body. A corresponding second control oil cavity is disposed in each fourth valve body. Each second valve core is movably installed in a corresponding fourth valve body, and each second valve core is configured to control on-offs between each second high-pressure oil cavity and the corresponding second low-pressure oil cavity.

Furthermore, the second oil hole is communicated with the first distribution semi-ring groove through a first distribution semi-ring groove hole. The second oil hole is communicated with the first distribution ring groove through a first distribution semi-ring groove hole. The first oil hole is communicated with the second distribution semi-ring groove through a second distribution semi-ring groove hole. The first oil hole is communicated with the second distribution ring groove through a second distribution ring groove hole. The second oil hole is communicated with the third distribution ring groove through a first distribution ring groove hole, and a third distribution ring groove hole.

Furthermore, a first control oil-way of the housing, the first oil hole, and a second control oil-way of the housing are communicated, or, the first control oil-way of the housing, the second oil hole, and the second control oil-way of the housing are communicated.

The present disclosure further provides a working method of the four-quadrant radial piston hydraulic device having two types of valves for flow distribution mentioned above. Specifically, when the four-quadrant radial piston hydraulic device is configured as a hydraulic motor, the high-pressure main port is connected with a pressure oil source. The high-pressure main port is an oil inlet channel, and the low-pressure main port is an oil outlet channel.

When the reversing slide valve is located at a first end of the reversing slide valve cavity, one of the plunger assemblies is located at a topmost position. Low-pressure oil is introduced into a corresponding second control oil cavity and a corresponding pilot-operated check valve cavity.

High-pressure oil flows through the high-pressure main port, a corresponding second high-pressure oil cavity, and a corresponding second low-pressure oil cavity and enters a corresponding plunger cavity. The high-pressure oil in the corresponding plunger cavity pushes a corresponding plunger to move downward, so that a volume of the corresponding plunger cavity increases, so as to drive the eccentric spindle to do positive circular motion until the one of the plunger assemblies reaches a bottommost position.

When the one of the plunger assemblies is located in the bottommost position, the eccentric spindle and the distribution shaft forwardly rotate 180 degrees, so that the high-pressure oil is introduced into the corresponding second control oil cavity and the corresponding pilot-operated check valve cavity. Under the thrust of other plunger assemblies and an inertial force of the eccentric spindle, the one of the plunger assemblies moves upward to reduce the volume of the corresponding plunger cavity. Oil in the corresponding plunger cavity flows out from the low-pressure main port after passing through a corresponding first high-pressure oil cavity and a corresponding first low-pressure oil cavity, so as to realize periodic movement of the one of the plunger assemblies. Reciprocating motion of the plunger assemblies causes the eccentric spindle to continuously output forward torque to convert hydraulic energy into mechanical energy.

When the reversing slide valve is located at a second end of the reversing slide valve cavity, the high-pressure oil flows through the high-pressure main port, a corresponding second high-pressure oil cavity, and a corresponding second low-pressure oil cavity and enters the corresponding plunger cavity. The high-pressure oil in the corresponding plunger cavity pushes the corresponding plunger to move downward to increase the volume of the corresponding plunger cavity, and drives the eccentric spindle to do reverse circular motion until the one of the plunger assemblies reaches the bottommost position.

After a reverse rotation of 180 degrees, under the thrust of the other plunger assemblies and the inertial force of the eccentric spindle, the one of the plunger assemblies moves upward to reduce the volume of the corresponding plunger cavity. The oil in the corresponding plunger cavity flows out from the low-pressure main port after passing through the corresponding first high-pressure oil cavity and the corresponding first low-pressure oil cavity, so as to realize the periodic movement of the one of the plunger assemblies. The reciprocating motion of the plunger assemblies causes the eccentric spindle to continuously output reverse torque to convert the hydraulic energy into the mechanical energy.

The present disclosure further provides a working method of the four-quadrant radial piston hydraulic device having two types of valves for flow distribution mentioned above. Specifically, in the working method, when the four-quadrant radial piston hydraulic device having two types of valves for flow distribution is configured as a hydraulic pump, the high-pressure main port is connected with a high-pressure oil tank or a hydraulic load. The high-pressure main port is an oil outlet channel, the low-pressure main port is connected with an oil tank, and the low-pressure main port is an oil inlet channel.

When the reversing slide valve is located at a first end of the reversing slide valve cavity, the eccentric spindle rotates in reverse to drive one of the plunger assemblies to move downward from a topmost position, so that a volume of a corresponding plunger cavity increases to generate a vacuum. At this time. a pressure in the corresponding plunger cavity is lower than a pressure of a low-pressure oil tank. oil in the low-pressure oil tank flows into the corresponding plunger cavity through the low-pressure main port, and a corresponding first low-pressure oil cavity and a corresponding first high-pressure oil cavity until the one of the plunger assemblies moves to a bottommost position. During this process, the eccentric spindle drives the distribution shaft to reversely rotate 180 degrees. The eccentric spindle continues to reversely rotate and the one of the plunger assemblies moves upward to reduce a volume of the corresponding plunger cavity and increase a pressure thereof. The pressure of the corresponding plunger cavity is greater than a pressure in the high-pressure oil tank or the hydraulic load. The oil in the corresponding plunger cavity flows through a corresponding second low-pressure oil cavity and a corresponding second high-pressure oil cavity and enters the high-pressure oil tank or the hydraulic load to realize an oil discharge movement of the one of the plunger assemblies. Through a reverse rotation of the eccentric spindle, low-pressure oil is sucked into each of the plunger cavities, is converted into high-pressure oil, and is discharged, so mechanical energy is converted into hydraulic energy.

When the reversing slide valve is located at a second end of the reversing slide valve cavity, the eccentric spindle rotates forward to drive the one of the plunger assemblies to move downward from the topmost position, so that the volume of the corresponding plunger cavity increases, and the vacuum is generated. At this time, the pressure in the corresponding plunger cavity is lower than the pressure in the low-pressure oil tank, the oil in the low-pressure oil tank flows into the corresponding plunger cavity through the low-pressure main port, the corresponding first low-pressure oil cavity, and the corresponding first high-pressure oil cavity until the one of the plunger assemblies moves to the bottommost position. During this process, the eccentric spindle drives the distribution shaft to forwardly rotate 180 degrees.

The eccentric spindle continues to rotate forward, so the one of the plunger assemblies moves upward to reduce the volume of the corresponding plunger cavity and increase the pressure thereof. The pressure of the corresponding plunger cavity is greater than the pressure in the high-pressure oil tank or the hydraulic load. The oil in the corresponding plunger cavity flows through the corresponding second low-pressure oil cavity and the corresponding second high-pressure oil cavity and enters the high-pressure oil tank or the hydraulic load to realize the oil discharge movement of the one of the plunger assemblies. Through the forward rotation of the eccentric spindle, the plunger assemblies are driven to suck the low-pressure oil into each of the plunger cavities, and the low-pressure oil is then converted into the high-pressure oil and is discharged, so that the mechanical energy is converted into the hydraulic energy.

In the present disclosure, the four-quadrant radial piston hydraulic device having two types of valves for flow distribution adopts the pilot-operated check valves and the two-way cartridge valves for flow distribution, so as to realize a distribution method of the present disclosure. Each of the pilot-operated check valves and a corresponding two-way cartridge valve that correspond to each plunger are controlled by a same control oil-way, which simplifies the control oil-ways of the four-quadrant radial piston hydraulic device. In addition, by arranging the distribution shaft that is inserted into the eccentric spindle and the confluence plate with the reversing slide valve therein, when the pilot-operated check valves and two-way cartridge valves perform flow distribution, a problem that the four-quadrant radial piston hydraulic device cannot rotate bidirectionally when the four-quadrant radial piston hydraulic device is serves as the hydraulic pump or the hydraulic motor is solved. The pilot-operated check valves have excellent sealing performance, and the two-way cartridge valves have excellent sealing performance and large valve diameter, so that the four-quadrant radial piston hydraulic device is capable of being used in high-pressure environments and achieves high volumetric efficiency. The four-quadrant radial piston hydraulic device realizes bidirectional rotation under the condition of working as the hydraulic motor and the hydraulic pump, solving a problem of limitations of valve flow distribution in the hydraulic motor and the hydraulic pump,

DETAILED DESCRIPTION

Figure 1:
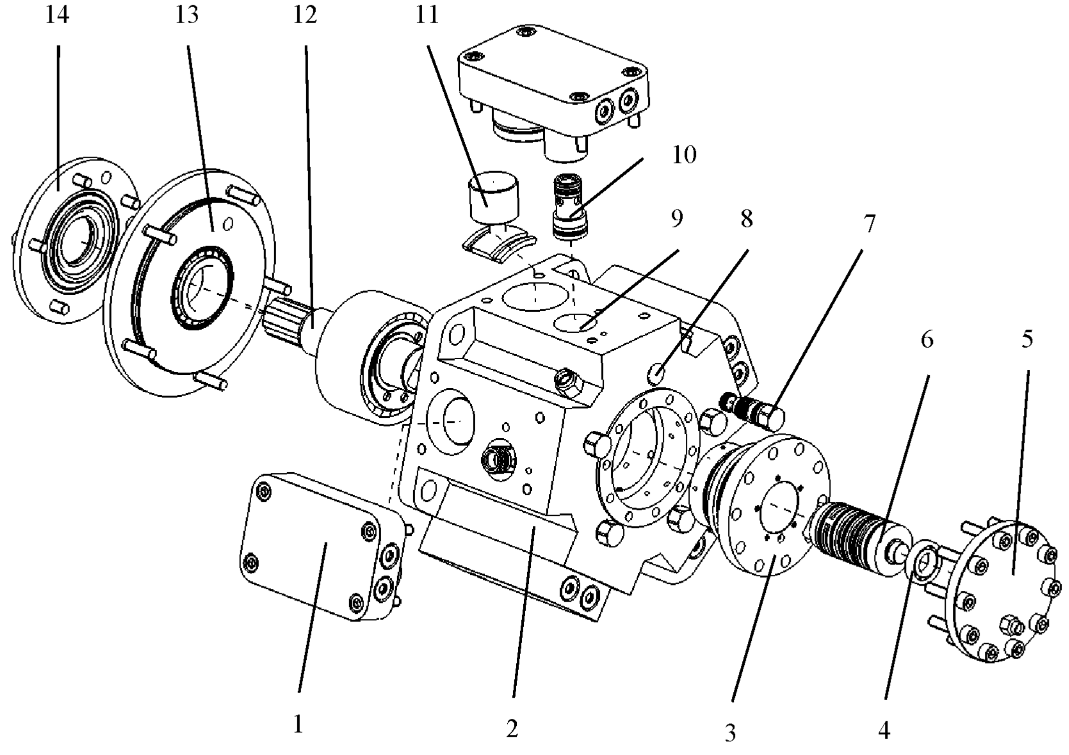
FIG. 1 is an exploded schematic diagram of a four-quadrant radial piston hydraulic device having two types of valves for flow distribution according to one embodiment of the present disclosure.

As shown in FIG. 1-FIG. 22, the embodiment provides a four-quadrant radial piston hydraulic device having two types of valves for flow distribution including a housing 2, plunger assemblies 11, an eccentric spindle 12 rotatably disposed on the housing 2, pilot-operated check valves 7 one-to-one corresponding to the plunger assemblies 11, and two-way cartridge valves 10 one-to-one corresponding to the plunger assemblies 11. The housing 2 defines plunger cavities 20, an eccentric spindle cavity 23, pilot-operated check valve cavities 8, two-way cartridge valve cavities 9, high-pressure oil-ways of the housing, low-pressure oil-ways, and control oil-ways therein. The pilot-operated check valve cavities 8 and the two-way cartridge valve cavities 9 respectively one-to-one correspond to the plunger assemblies 11. Each of the plunger assemblies 11 is slidably disposed in a corresponding plunger cavity 20 along a vertical direction. The eccentric spindle 12 is rotatably assembled in the eccentric spindle cavity 20, and is in transmission connection with the plunger assemblies 11. The four-quadrant radial piston hydraulic device having two types of valves for flow distribution further includes a distribution shaft 6 and a confluence plate 3. The distribution shaft 6 is connected with the eccentric spindle 12 through a cartridge way, and a reversing slide valve 101 is disposed on the confluence plate 3.

The distribution shaft 6 defines a first distribution ring groove 76, a second distribution ring groove 78, and a third distribution ring groove 77 thereon, all of which are communicated with a high-pressure main port 32 or a low-pressure main port 30. The distribution shaft 6 defines a first distribution semi-ring groove 75, a second distribution semi-ring groove 79, a first oil hole 82, and a second oil hole 81 thereon. The first oil hole 82 is communicated with the second distribution semi-ring groove 79 and the second distribution ring groove 78. The second oil hole 81 is communicated with the first distribution semi-ring groove 75, the first distribution ring groove 76, and the third distribution ring groove 77.

The confluence plate 3 defines a high-pressure ring groove 65, a low-pressure ring groove 66, a reversing slide valve cavity 72, control oil-way of the confluence plate 71, and the reversing slide valve 101 thereon. The high-pressure ring groove 65 defines a high-pressure ring groove hole 70 thereon, and the low-pressure ring groove 66 defines a low-pressure ring groove hole 73 thereon. A first side of the reversing slide valve cavity 72 is communicated with the high-pressure ring groove 65 and the low-pressure ring groove 66 respectively by the high-pressure ring groove hole 70 and the low-pressure ring groove hole 73. A second side of the reversing slide valve cavity 72 is communicated with the first distribution ring groove 76, the second distribution ring groove 78, and the third distribution ring groove 77. The reversing slide valve 101 is inserted in the reversing slide valve cavity 72. The reversing slide valve 101 is configured to enable the high-pressure ring groove 65 to switch between being communicated with the first distribution ring groove 76 and being communicated with the second distribution ring groove 78, and to enable the low-pressure ring groove 66 to switch between being communicated with the second distribution ring groove 78 and being communicated with the third distribution ring groove 77.

Each of the pilot-operated check valves 7 and each of the two-way cartridge valves 10 are respectively disposed in a corresponding cavity, and are connected with a corresponding high-pressure oil-way, a corresponding low-pressure oil-way, and a corresponding control oil-way of the housing 2. Each of the pilot-operated check valves 7 comprises a first control oil cavity 43, a first high-pressure oil cavity 35 and a first low-pressure oil cavity 38. Each first high-pressure oil cavity 35 is communicated with a corresponding plunger cavity 20. Each first low-pressure oil cavity 38 is communicated with the low-pressure ring groove 66. Each first control oil cavity 43 is alternately communicated with the first distribution semi-ring groove 75 and the second distribution semi-ring groove 79. When each first control oil cavity 43 and each first high-pressure oil cavity 35 are subjected to high pressure simultaneously, each first high-pressure oil cavity 35 and each first low-pressure oil cavity 38 are communicated. Each of the two-way cartridge valves 10 comprises a second control oil cavity 59, a second high-pressure oil cavity 52, and a second low-pressure oil cavity 55. Each second low-pressure oil cavity 55 is communicated with a corresponding plunger cavity 20. Each second high-pressure oil cavity 52 is communicated with the high-pressure ring groove 65. Each second control oil cavity 59 is alternately communicated with the first distribution semi-ring groove 75 and the second distribution semi-ring groove 79. When each second control oil cavity 59 and each second high-pressure oil cavity 52 are subjected to high pressure simultaneously, each second high-pressure oil cavity 52 and each second low-pressure oil cavity 55 are closed.

Figure 2:
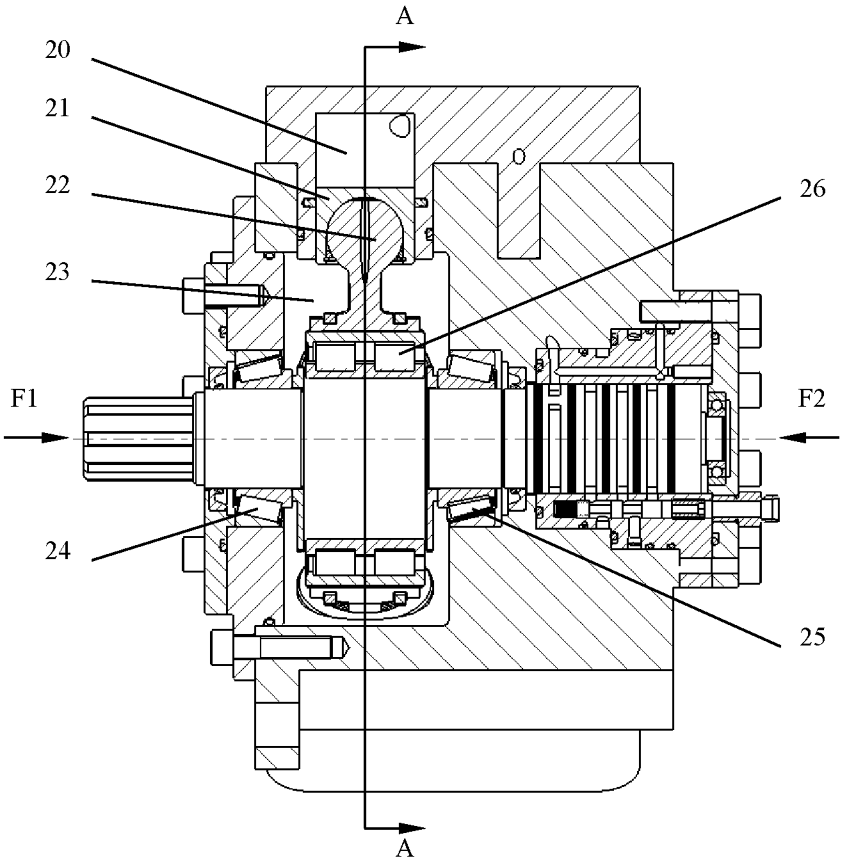
FIG. 2 is a axial cross-sectional schematic diagram of the four-quadrant radial piston hydraulic device having two types of valves for flow distribution according to one embodiment of the present disclosure.
Figure 3:
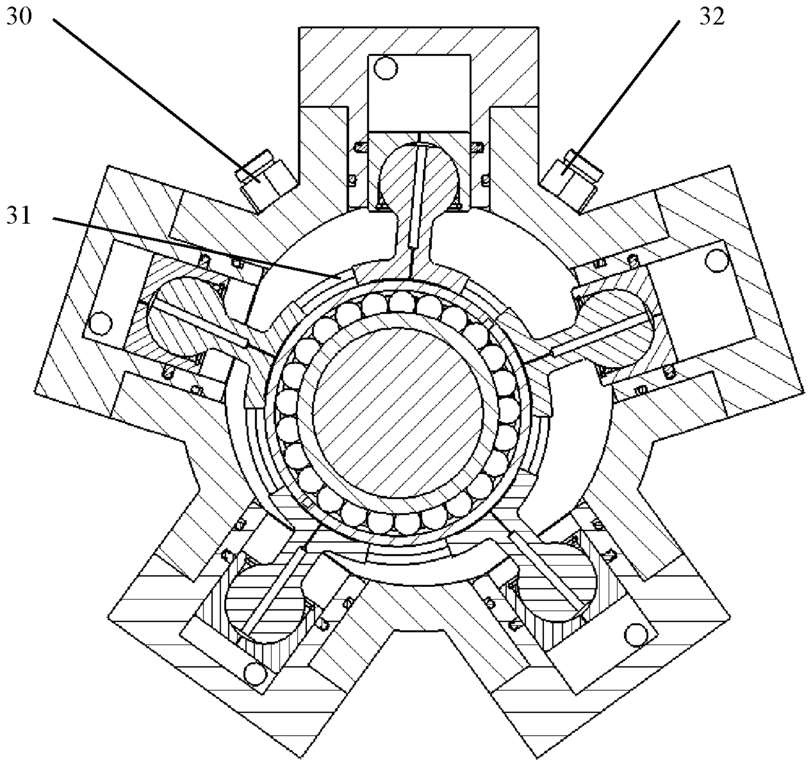
FIG. 3 is a cross-sectional schematic diagram of the four-quadrant radial piston hydraulic device having two types of valves for flow distribution taken along the line A-A shown in FIG. 2.

As shown in FIG. 1 and FIG. 2, in the embodiment, the housing 2 is coaxially connected with a shaft end cover 14, a housing end cover 13, the eccentric spindle 12, the confluence plate 3, and a distribution shaft end cover 5 in turn. The housing 2 defines the plunger cavities 20, the eccentric spindle cavity 23, the pilot-operated check valve cavities 8, the two-way cartridge valve cavities 9, high-pressure oil-ways of the housing, low-pressure oil-ways, and control oil-ways therein. The pilot-operated check valve cavities 8 and the two-way cartridge valve cavities 9 respectively one-to-one correspond to the plunger assemblies 11.

For example, the housing 2 defines a first high-pressure oil-way 90 of the housing, a second high-pressure oil-way 93 of the housing, a first control oil-way 105 of the housing, a second control oil-way 95 of the housing, a low-pressure oil-way 107 of the housing and the like. A plunger 21 and a plunger end cover 1 form each of the plunger cavities 20. As shown in FIG. 2, in the embodiment, there are five plunger end covers 1 and five plunger cavities 20. Each of the pilot-operated check valves 7 and a corresponding two-way cartridge valve 10 are correspondingly disposed on a corresponding plunger cavity 20. Each of the pilot-operated check valves 7 and each of the two-way cartridge valves 10 are respectively disposed in a corresponding pilot-operated check valve cavity 8 and a corresponding two-way cartridge valve cavity 9. The number of the plunger cavities 20 is not limited thereto, and there may be 8 or 10 plunger cavities 20. The eccentric spindle cavity 23 is configured for installing the eccentric spindle 12. A second bearing 24 and a third bearing 25 are respectively disposed on the housing end cover 13 and the housing 2, and the second bearing 24 and the third bearing 25 are configured for supporting the eccentric spindle 12.

Each of the plunger assemblies 11 is slidably disposed in the plunger cavity 20 along the vertical direction. In the embodiment, each of the plunger assemblies 11 comprises a corresponding plunger 21 and a connecting rod sliding shoe 22. Each plunger 21 is slidably disposed in a corresponding plunger cavity 20 along a vertical direction. A top end of each connecting rod sliding shoe 22 is sleeved in a corresponding plunger 21, and a bottom end of each connecting rod sliding shoe 22 is fixed on a fourth bearing 26 outside the eccentric spindle 12 through a corresponding return ring 31. When the four-quadrant radial piston hydraulic device is served as a hydraulic motor, each plunger 21 slides up and down in the corresponding plunger cavity 20 and drives the eccentric spindle 12 to rotate by the corresponding connecting rod sliding shoe 22 and the corresponding return ring 31. Alternatively, when the four-quadrant radial piston hydraulic device is served as a hydraulic pump, the eccentric spindle 12 rotates and drives each plunger 21 to slide up and down in the corresponding plunger cavity 20 by the corresponding connecting rod sliding shoe 22 and the corresponding return ring 31.

The eccentric spindle 12 is disposed in the eccentric spindle cavity 23, and a second bearing 24 and a third bearing 25 are respectively disposed on a left side and a right side thereof. The second bearing 24 and the third bearing 25 are respectively disposed on the housing end cover 13 and the housing 2. The second bearing 24 and the third bearing 25 stably support the eccentric spindle 12.

Figure 4:
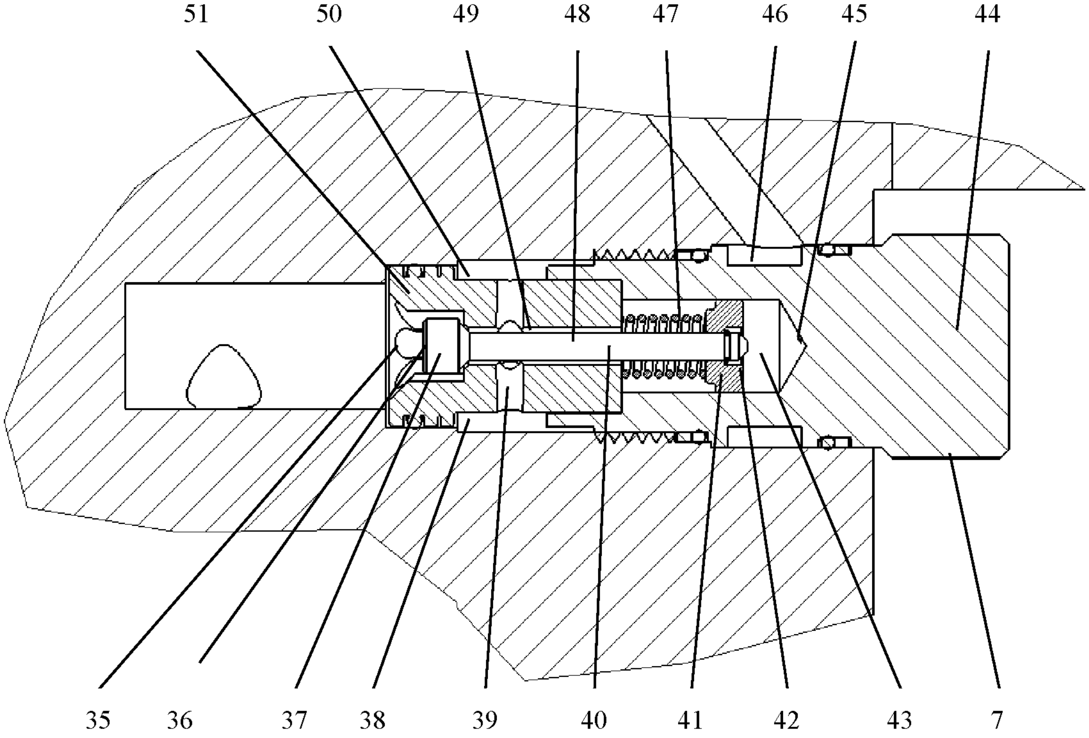
FIG. 4 is a cross-sectional schematic diagram of a pilot-operated check valve of the four-quadrant radial piston hydraulic device having two types of valves for flow distribution according to one embodiment of the present disclosure.

As shown in FIG. 1 and FIG. 4, in the embodiment, there are 5 pilot-operated check valves 7, all of the pilot-operated check valves 7 are distributed on one side (i.e., an F2 side shown in FIG. 2) of the housing 2. Each of the pilot-operated check valves 7 comprises a first valve body 44, a second valve body 51, a first valve core 48, and a first elastic piece 47. Each second valve body 51 defines a first movable cavity 49, a first high-pressure oil cavity 35 and a first low-pressure oil cavity 38 thereon. Each first valve body 44 defines a corresponding first control oil cavity 43. A first valve core 48 is movably disposed on each second valve body 51, and each first valve core 48 is configured to control on-offs between each first high-pressure oil cavity 35 and a corresponding first low-pressure oil cavity 38. Each first high-pressure oil cavity 35 is communicated with a corresponding plunger cavity 20. Each first low-pressure oil cavity 38 is communicated with a low-pressure main port 30. Each first control oil cavity 43 is alternately connected with the first distribution semi-ring groove 75 and the second distribution semi-ring groove 79. Specifically, as shown in FIG. 4, each first valve body 44 defines a first ring groove 46, and a first through hole 45 is on the first ring groove 46, so that each first ring groove 46 is communicated with a corresponding first control oil cavity 43. Each second valve body 51 defines a second ring groove 50, and a second through hole 39 is on the second ring groove 50 thereof, so that each second ring groove 50 is communicated with a corresponding first low-pressure oil cavity 38. The first valve core 48 of each of the pilot-operated check valves 7 includes a valve core column 40, a first valve core block 37, and a second valve core block 41. Each first valve core block 37 and a corresponding second valve core block 41 are fixedly connected with two ends of the valve core post 40 respectively. Each valve core column 40 is movably sleeved in a corresponding first movable cavity 49 and is configured to drive a corresponding first valve core block 37 to move synchronously with a corresponding second valve core block 41. Each second valve core block 41 is located in a corresponding first control oil cavity 43 and separates the corresponding first control oil cavity 43 into two independent valve body oil control cavities. Each first valve core block 37 is accommodated in a corresponding first high-pressure oil cavity 35 and is configured to control the on-offs of the corresponding first high-pressure oil cavity 35. A first elastic piece 47 is disposed on each of the pilot-operated check valves 7, and each first elastic piece 47 is disposed between a corresponding second valve core block 41 and a corresponding second valve body 51. Each first valve core block 37 defines a first compressed surface 36, and each second valve core block 41 defines a second compressed surface 42. An area of each first compressed surface 36 is less than an area of each second compressed surface 42. Therefore, under a certain suitable pilot ratio, under a condition that each first high-pressure oil cavity 35 and a corresponding first control oil cavity 43 are subjected to high-pressure oil at the same time, each first high-pressure oil cavity 35 and a corresponding first low-pressure oil cavity 38 are opened. Namely, each of the pilot-operated check valves 7 is opened under high pressure and is closed under low pressure.

Figure 5:
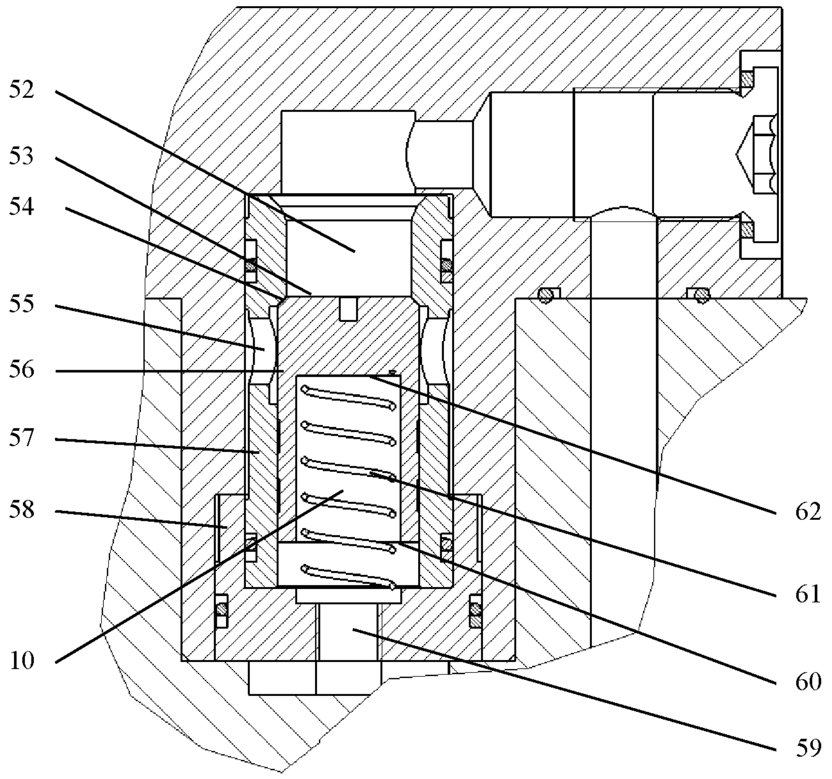
FIG. 5 is a cross-sectional schematic diagram of a two-way cartridge valve of the four-quadrant radial piston hydraulic device having two types of valves for flow distribution according to one embodiment of the present disclosure.

As shown in FIG. 1 and FIG. 5, in the embodiment, there are five two-way cartridge valves 10, and all of the two-way cartridge valves 10 are distributed on the housing 2, and are in the two-way cartridge valve cavity 9. Each of the two-way cartridge valves 10 includes a third valve body 57, a fourth valve body 58, a second valve core 56, and a second elastic piece 61. Each third valve body 57 defines a second high-pressure oil cavity 52 and a second low-pressure oil cavity 55. Each fourth valve body 58 defines a second control oil cavity 59. Each second high-pressure oil cavity 52 is always communicated with the high-pressure oil, and each second low-pressure oil cavity 55 is communicated with a corresponding plunger cavity 20. Each second control oil cavity 59 is alternately communicated with the first distribution semi-ring groove 75 and the second distribution semi-ring groove 79. Each second valve core 56 is slidably in a cavity of a corresponding third valve body 57. A first end of each second elastic piece 61 is in contact with a corresponding fourth valve body 58, and a second end of each second elastic piece 61 is in contact with a corresponding second valve core 56. Each second valve core 56 defines an inclined surface 54 configured to control on-offs of a corresponding second high-pressure oil cavity 52 and a corresponding second low-pressure oil cavity 55. A first end of each second valve core 56 close to a corresponding inclined surface 54 defines a first compressed surface 53, and a second end of each second valve core 56 defines a second compressed surface 60 and a third compressed surface 62. An area of the first compressed surface 53 thereof is less than a sum of an area of the second compressed surface 60 thereof and an area of the third compressed surface 62 thereof. Therefore, under a suitable pilot ratio, when each second control oil cavity 59 and a corresponding second high-pressure oil cavity 52 are configured to store the high-pressure oil at the same time, a corresponding second valve core 56 is closed, and the corresponding second high-pressure oil cavity 52 and a corresponding second low-pressure oil cavity 55 are cut off. Namely, each of the two-way cartridge valves 10 is closed under high pressure and is opened at low pressure.

Figure 6:
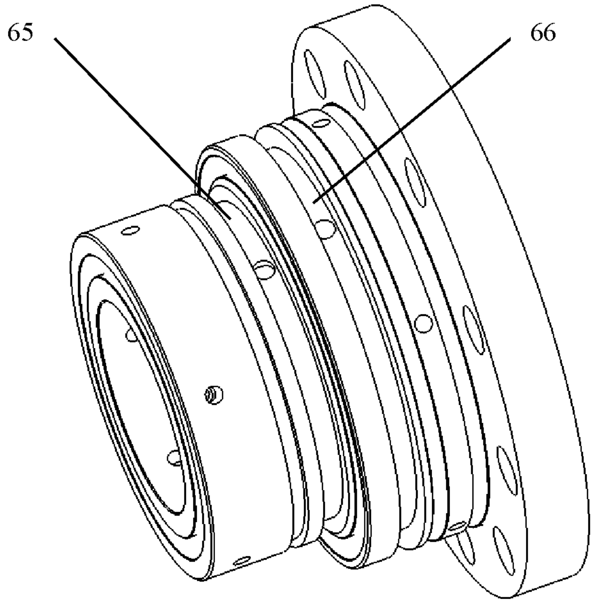
FIG. 6 is a schematic diagram of a confluence plate of the four-quadrant radial piston hydraulic device having two types of valves for flow distribution according to one embodiment of the present disclosure.
Figure 7:
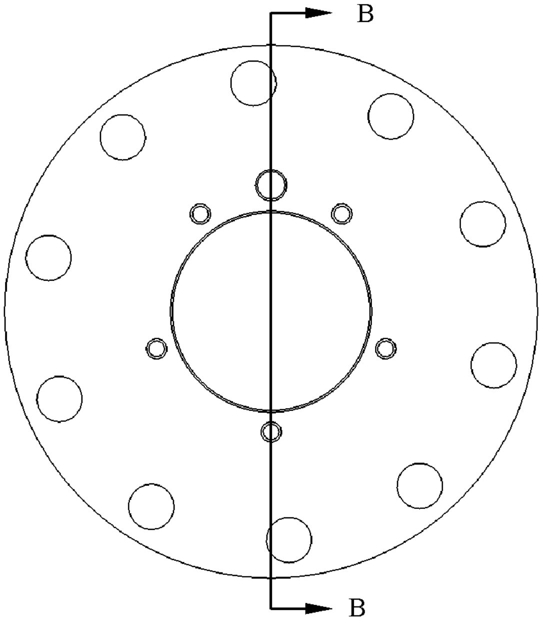
FIG. 7 is a front schematic diagram of the confluence plate of the four-quadrant radial piston hydraulic device having two types of valves for flow distribution according to one embodiment of the present disclosure.
Figure 8:
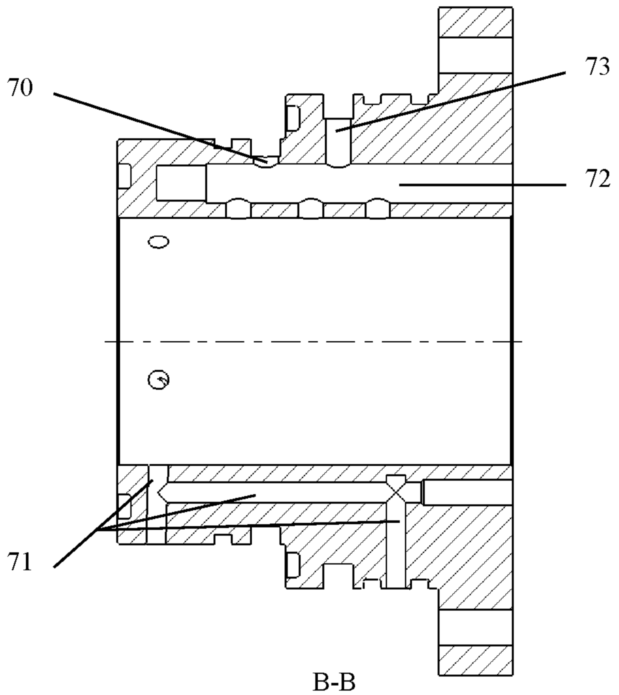
FIG. 8 is a cross-sectional schematic diagram of the confluence plate taken along the line B-B shown in FIG. 7.
Figure 9:
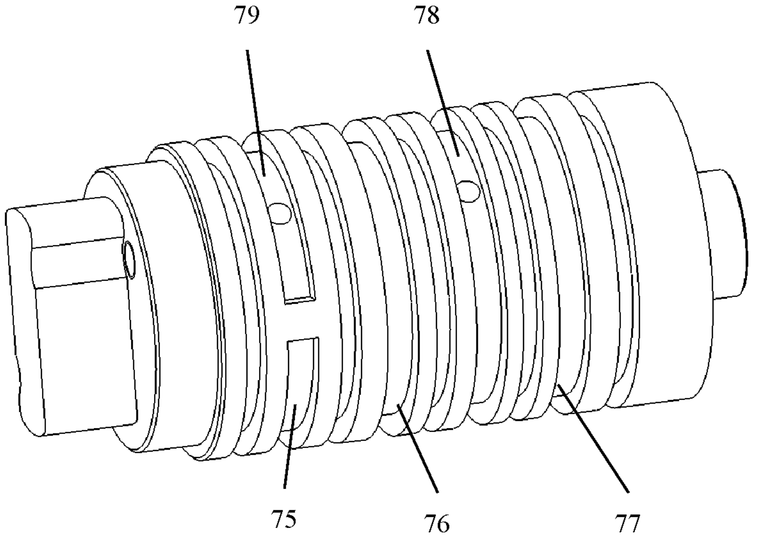
FIG. 9 is a schematic diagram of appearance of a distribution shaft of the four-quadrant radial piston hydraulic device having two types of valves for flow distribution according to one embodiment of the present disclosure.
Figure 10:
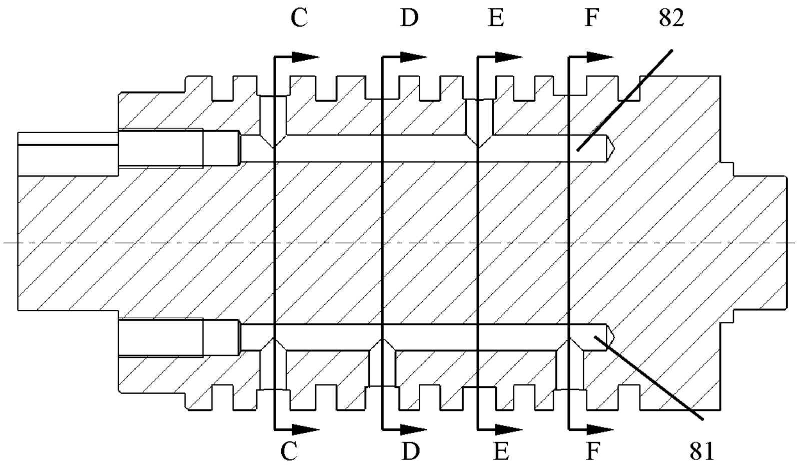
FIG. 10 is a cross-sectional schematic diagram of the distribution shaft of the four-quadrant radial piston hydraulic device having two types of valves for flow distribution according to one embodiment of the present disclosure.
Figure 11:
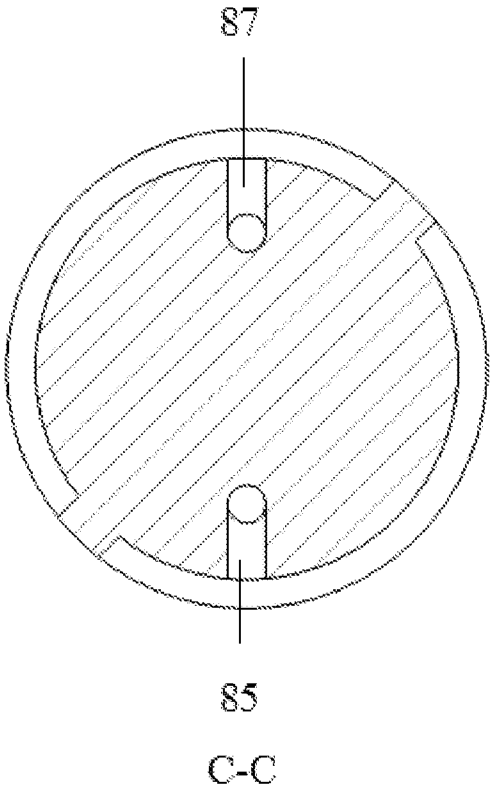
FIG. 11 is a cross-sectional schematic diagram of the distribution shaft taken along the line C-C shown in FIG. 10.
Figure 12:
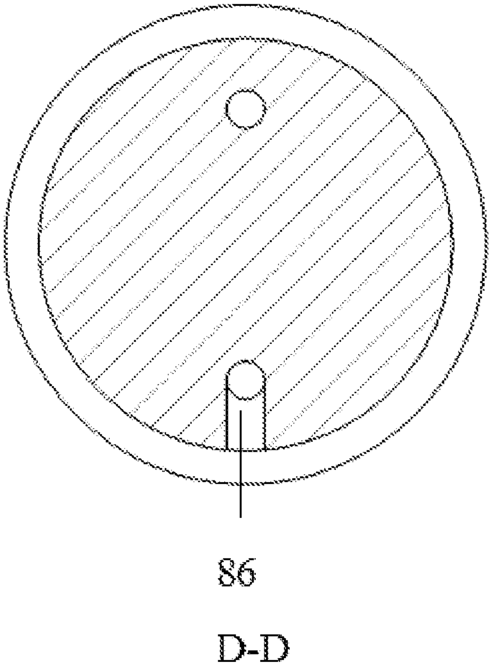
FIG. 12 is a cross-sectional schematic diagram of the distribution shaft taken along the line D-D shown in FIG. 10.
Figure 13:
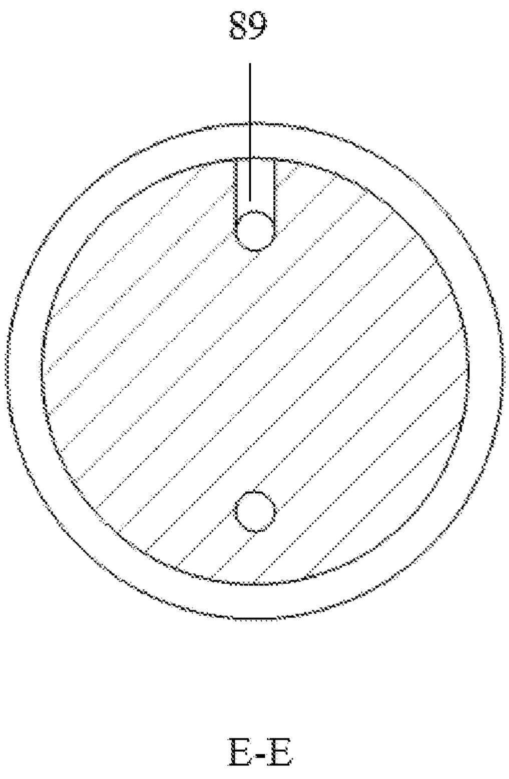
FIG. 13 is a cross-sectional schematic diagram of the distribution shaft taken along the line E-E shown in FIG. 10.
Figure 14:
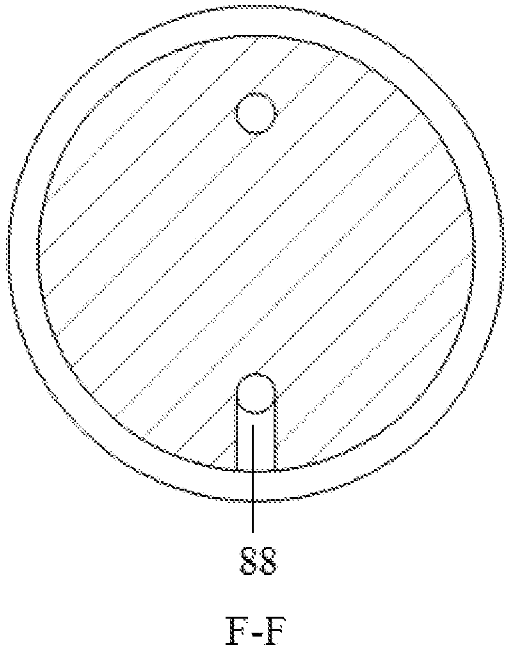
FIG. 14 is a cross-sectional schematic diagram of the distribution shaft taken along the line F-F shown in FIG. 10.
Figure 15:
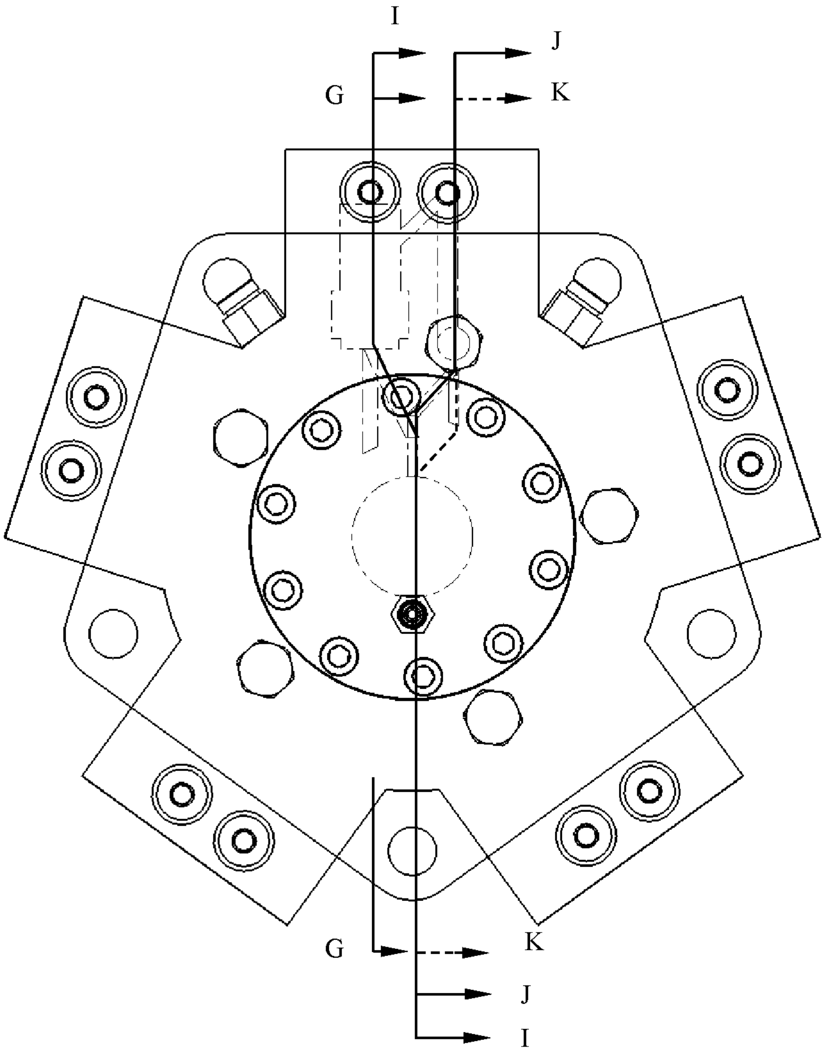
FIG. 15 is a schematic diagram of a F2 side of the four-quadrant radial piston hydraulic device having two types of valves for flow distribution according to one embodiment of the present disclosure.
Figure 16:
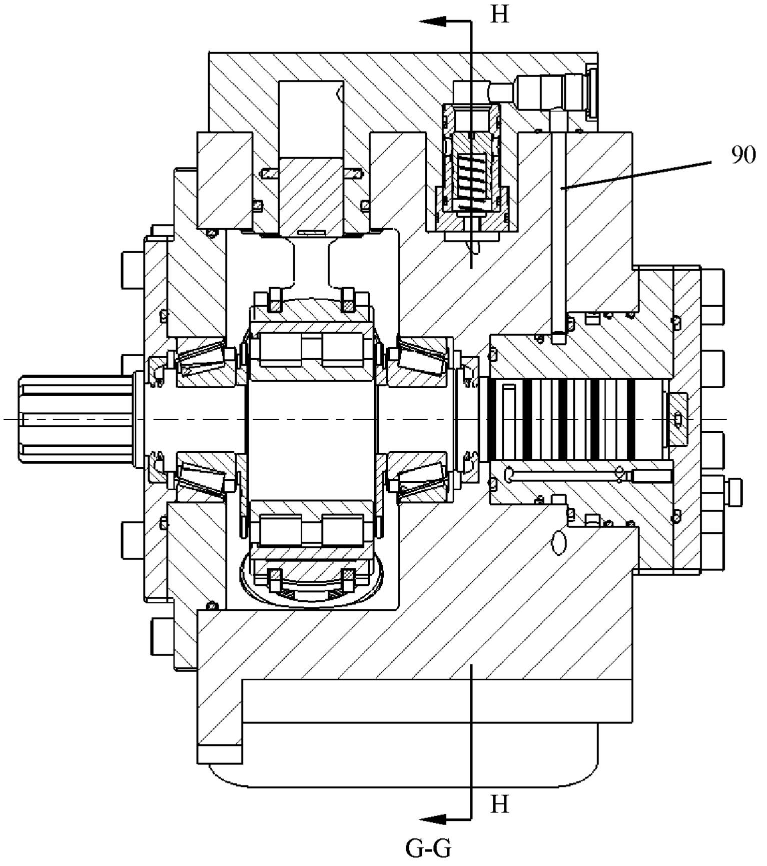
FIG. 16 is a cross-sectional schematic diagram of the four-quadrant radial piston hydraulic device having two types of valves for flow distribution taken along the line G-G shown in FIG. 15.
Figure 17:
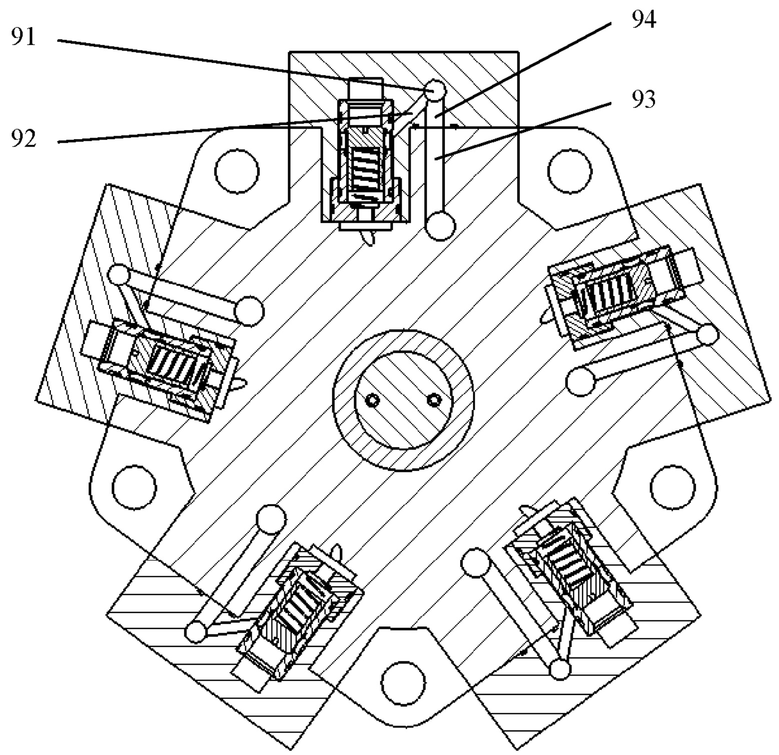
FIG. 17 is a cross-sectional schematic diagram of the four-quadrant radial piston hydraulic device having two types of valves for flow distribution taken along the line H-H shown in FIG. 16.
Figure 18:
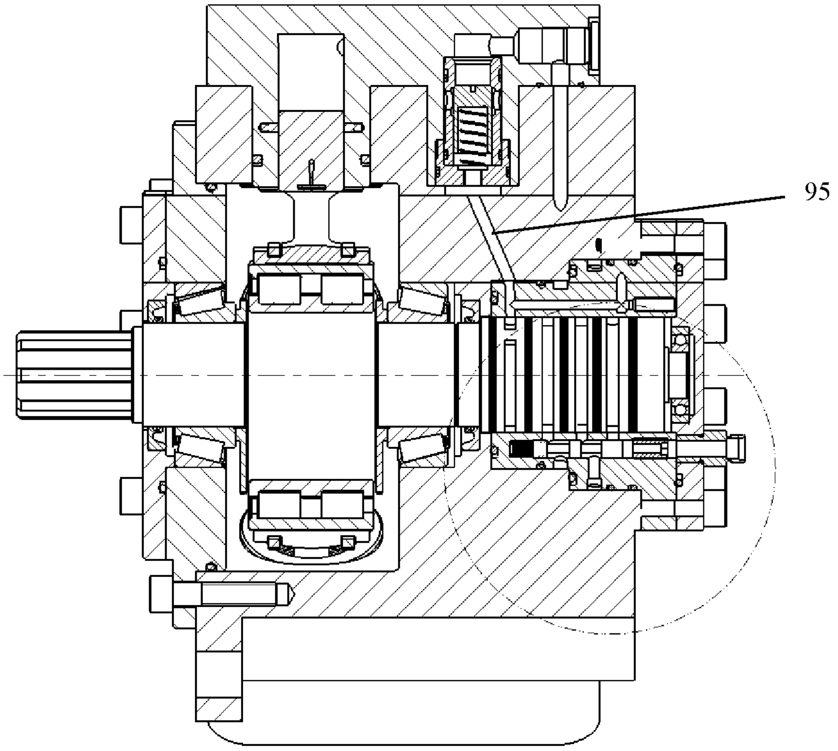
FIG. 18 is a cross-sectional schematic diagram of the four-quadrant radial piston hydraulic device having two types of valves for flow distribution taken along the line I-I shown in FIG. 15.
Figure 19:
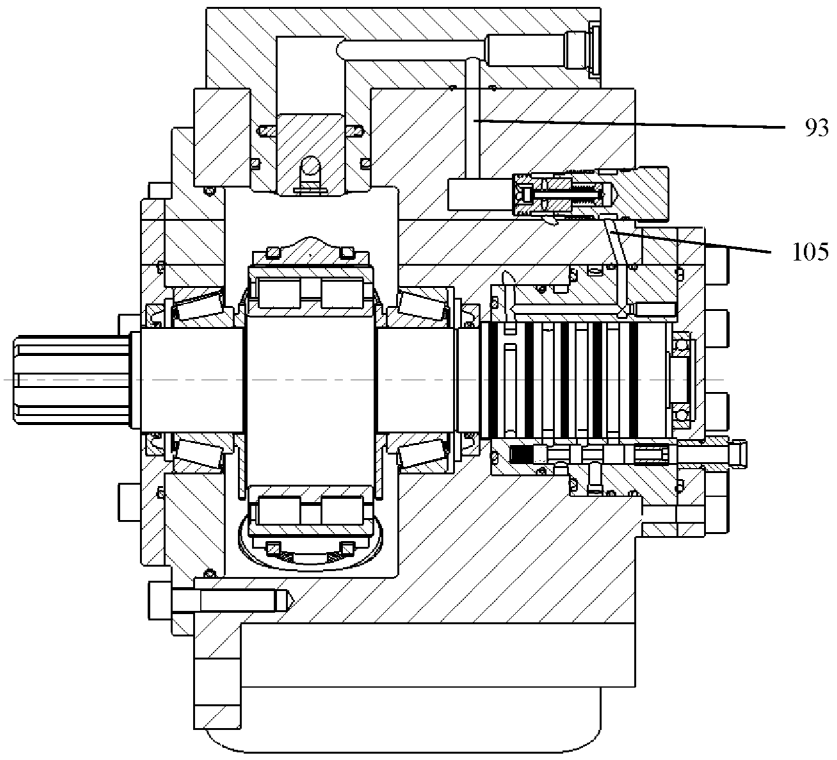
FIG. 19 is a cross-sectional schematic diagram of the four-quadrant radial piston hydraulic device having two types of valves for flow distribution taken along the line J-J shown in FIG. 15.
Figure 20:
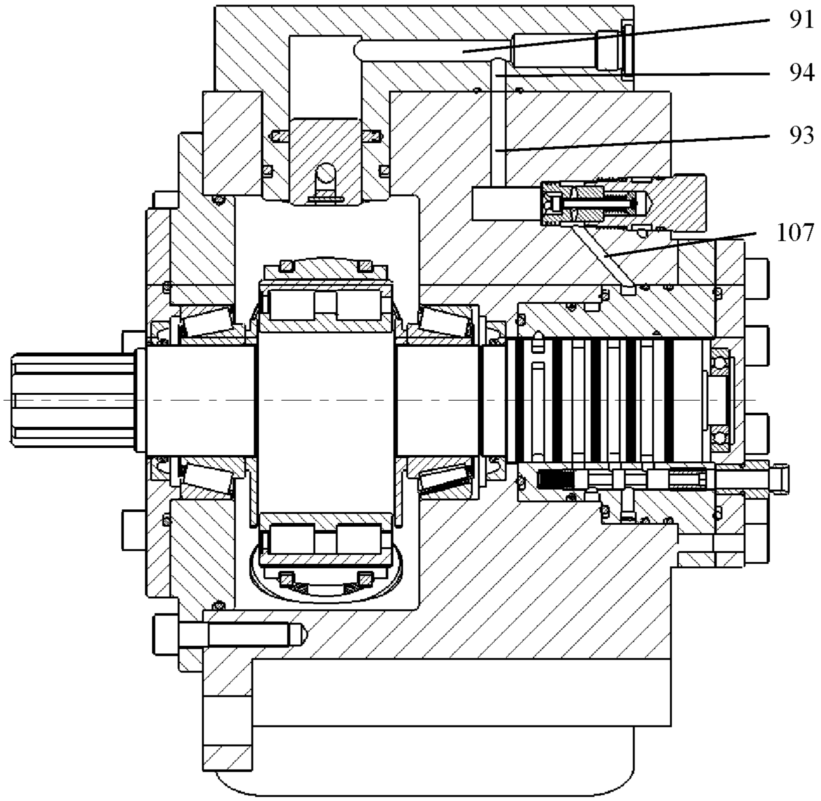
FIG. 20 is a cross-sectional schematic diagram of the four-quadrant radial piston hydraulic device having two types of valves for flow distribution taken along the line K-K shown in FIG. 15.
Figure 21:
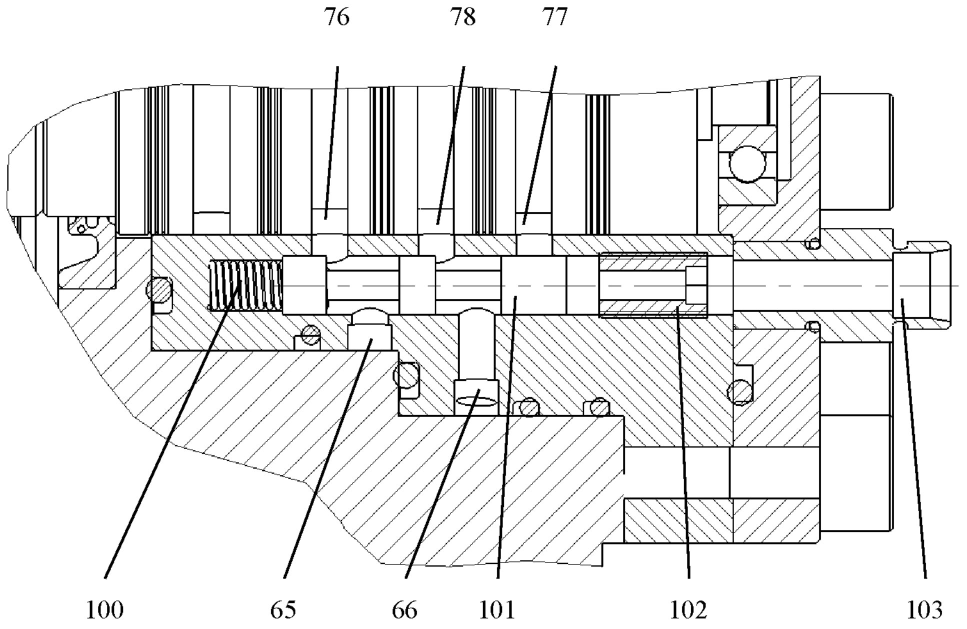
FIG. 21 is an enlarged partial schematic diagram of a side of a reversing slide valve close a compression spring in FIG. 18.
Figure 22:
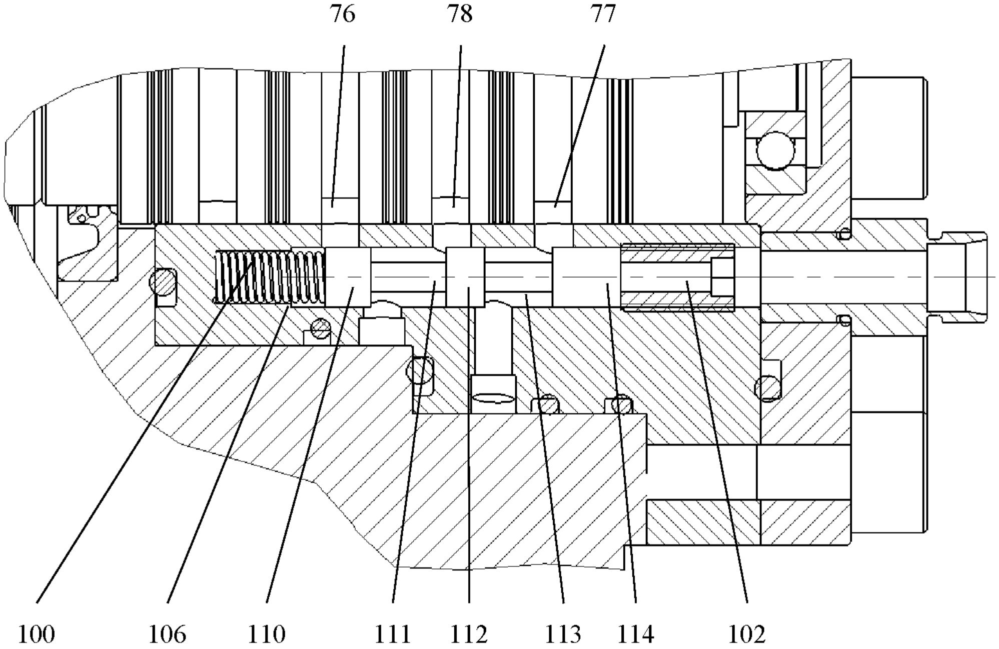
FIG. 22 is an enlarged partial schematic diagram of a side of the reversing slide valve away from the compression spring in FIG. 18.

As shown in FIG. 6 to FIG. 8, a left end of the distribution shaft 6 is inserted into the eccentric spindle 12 and a right end of the distribution shaft 6 is supported on the distribution shaft end cover 5 by the first bearing 4. The distribution shaft 6 defines the first distribution ring groove 76, the second distribution ring groove 78, the third distribution ring groove 77, the first distribution semi-ring groove 75, the second distribution semi-ring groove 79, the first oil hole 82 and the second oil hole 81 thereon. The first distribution ring groove 76, the second distribution ring groove 78, the third distribution ring groove 77, the first distribution semi-ring groove 75, the second distribution semi-ring groove 79 respectively define the first distribution ring groove hole 86, the second distribution ring groove hole 89, the third distribution ring groove hole 88, the first distribution semi-ring groove hole 85, the second distribution semi-ring groove hole 87. The high-pressure main port 32 or the low-pressure main port 30 is communicated with the first distribution ring groove 76, the second distribution ring groove 78 and the third distribution ring groove 77. The first oil hole 82 is communicated with the second distribution semi-ring groove 79 and the second distribution ring groove 78. The second oil hole 81 is communicated with the first distribution semi-ring groove 75, the first distribution ring groove 76 and the third distribution ring groove 77.

As shown in FIG. 15 to FIG. 22, the confluence plate 3 is mounted on the F2 side of the housing by bolts. The confluence plate 3 defines a high-pressure ring groove 65, a low-pressure ring groove 66, a reversing slide valve cavity 72, and a confluence plate control oil-way 71. A high-pressure ring groove hole 70 is formed on the high-pressure ring groove 65, and a low-pressure ring groove hole 73 is formed on the low-pressure ring groove 66. A first end of the high-pressure ring groove hole 70 is communicated with the high-pressure main port 32, and a second end is communicated with the first distribution ring groove 76 or the second distribution ring groove 78 of the distribution shaft 6. A first end of the low-pressure ring groove hole 73 is communicated with the low-pressure main port 30, and a second end of the low-pressure ring groove hole 73 is communicated with the second distribution ring groove 78 or the third distribution ring groove 77 of the distribution shaft 6. The reversing slide valve cavity 72 is configured for installing the reversing slide valve 101. The reversing slide valve 101 comprises a valve spool 111. A first stop block 110, a second stop block 112, and a third stop block 114 are disposed on the valve spool, and a communicating groove 113 is disposed between each two adjacent stop blocks. Each communicating groove 113 is configured to enable the high-pressure ring groove 65 to switch between being communicated with the first distribution ring groove 76 and being communicated with the second distribution ring groove 78 when the valve spool 111 slides, and to enable the low-pressure ring groove 66 to switch between being communicated with the second distribution ring groove 78 and being communicated with the third distribution ring groove 77. A limiting screw 102 is disposed on a first end of the reversing slide valve 101 close to a distribution shaft end cover 5, and the limiting screw 102 is configured to stabilize the valve spool 111. A compression spring 100 is disposed on a second end of the reversing slide valve 101, and the compression spring 100 is connected with the valve spool 111. When the reversing slide valve 101 is located close to one side of the compression spring 100, the first distribution ring groove 76 is communicated with the high-pressure ring groove 65, and the second distribution ring groove 78 is communicated with the low-pressure ring groove 66. When the reversing slide valve 101 is located on one side away from the compression spring 100, the second distribution ring groove 78 is communicated with the high-pressure ring groove 65, and the third distribution ring groove 77 is communicated with the low-pressure ring groove 66. A first end of the confluence plate control oil-way 71 is communicated with the first control oil-way 105 of the housing and the second control oil-way 95 of the housing, and a second end of the confluence plate control oil-way 71 is alternately communicated with the first distribution semi-ring groove 75 and the second distribution semi-ring groove 79 of the distribution shaft 6.

As shown in FIG. 15 to FIG. 22, in another embodiment, the embodiment of the present disclosure provides a working method of the four-quadrant radial piston hydraulic device having two types of valves for flow distribution. Specifically, when the four-quadrant radial piston hydraulic device is served as the hydraulic motor, the high-pressure main port 32 is connected with a pressure oil source. The high-pressure main port 32 is an oil inlet channel, and the low-pressure main port 30 is an oil outlet channel. The embodiment takes one of the plunger assemblies 11 as an example for illustration.

As shown in FIG. 15 to FIG. 22, when the reversing slide valve 101 is located on one side away from the compression spring 100, the reversing slide valve 101 is in contact with the limiting screw 102 under an elastic force of the compression spring 100, so that the reversing slide valve 101 is in a stable position. At this time, the high-pressure ring groove 65 is communicated with the second distribution ring groove 78, and the low-pressure ring groove 66 is communicated with the third distribution ring groove 77. When the one of the plunger assemblies 11 is located at a topmost position, a first part of the high-pressure oil flows into the high-pressure ring groove 65 from the high-pressure main port 32, and enters the first high-pressure oil-way 90 of the housing. The first high-pressure oil-way 90 of the housing is communicated with each second high-pressure oil cavity 52. A second part of high-pressure oil enters high-pressure ring groove 65 from the high-pressure main port 32, enters the reversing slide valve cavity 72 from high-pressure ring groove hole 70, enters the second distribution ring groove 78 again, enters the manifold control oil-way 71 after flowing through the first oil hole 82 of the distribution shaft again, and then enters the second control oil-way 95 of the housing. The second control oil-way 95 of the housing is communicated with a corresponding second control oil cavity 59. The distribution shaft 6 rotates together with the eccentric spindle 12, so the first control oil-way 105 of the housing and the second control oil-way 95 of the housing are switched between high pressure and low pressure.

The first control oil-way 105, the first oil hole 82 or the second oil hole 81, the second control oil-way 95 are communicated, so the first control oil-way 105 of the housing and the second control oil-way 95 of the housing are in a high pressure state or a low pressure state at the same time. When the first control oil-way 105 of the housing and the second control oil-way 95 of the housing are in the low pressure state a corresponding second high-pressure oil cavity 52 is communicated with a corresponding second low-pressure oil cavity 53, the high-pressure oil flows through the corresponding second low-pressure oil cavity 55 and the first oil-way 92 of the plunger end cove, and enters the corresponding plunger cavity 20. The high-pressure oil in the corresponding plunger cavity 20 pushes the one of the plunger assemblies 11 to move downward. When the one of the plunger assemblies 11 is located in the bottommost position, the eccentric spindle 12 and the distribution shaft 6 forwardly rotate 180 degrees, and the first control oil-way 105 of the housing and the second control oil-way 95 of the housing are in the high pressure state. The corresponding second high-pressure oil cavity 52 and the corresponding second low-pressure oil cavity 55 are closed, and the first control oil-way 105 of the housing and corresponding first control oil cavity 43 are communicated. At this time, a corresponding first high-pressure oil cavity 35 and a corresponding first low-pressure oil cavity 38 are communicated, oil in the corresponding plunger cavity 20 flows out from the low-pressure main port 30 after passing through a second oil-way 91 of the plunger end cover, a third oil-way 94 of the plunger end cover, a second high-pressure oil-way 93 of the housing, the corresponding first high-pressure oil cavity 35, the corresponding first low-pressure oil cavity 38, the low-pressure oil-way 107 of the housing, and the low-pressure ring groove 66. Reciprocating motion of the plunger assemblies 11 causes the eccentric spindle to continuously output forward torque to convert hydraulic energy into mechanical energy.

When the hydraulic motor is to reversely rotate, the high-pressure oil is introduced into, a control oil port 103, and the high-pressure oil pushes the reversing slide valve 101 to move to one side close to the compression spring 100. The reversing slide valve 101 is in a stable position after moving to a limiting step 106. At this time, the high-pressure ring groove 65 is communicated with the first distribution ring groove 76, and the low-pressure ring groove 66 is communicated with the second distribution ring groove 78. The high-pressure oil flows through the high-pressure main port 32, a corresponding second high-pressure oil cavity 52, and a corresponding second low-pressure oil cavity 55 and enters the corresponding plunger cavity 20. The high-pressure oil in the corresponding plunger cavity 20 pushes the corresponding plunger 21 moves downward so as to increase the volume of the corresponding plunger cavity 20, and drives the eccentric spindle 12 to do reverse circular motion until the one of the plunger assemblies 11 reaches the bottommost position. After the eccentric spindle 12 reversely rotates for 180 degrees, under the thrust of other plunger assemblies 11 and the inertial force of the eccentric spindle 12, the one of the plunger assemblies 11 moves upward, so that the volume of the corresponding plunger cavity 20 is reduced. The oil in the corresponding plunger cavity 20 flows out from the low-pressure main port 30 after passing through the corresponding first high-pressure oil cavity 35 and the corresponding first low-pressure oil cavity 38, to realize the periodic movement of the one of the plunger assemblies 11. The reciprocating motion of the plunger assemblies 11 causes the eccentric spindle 12 to continuously output reverse torque to convert the hydraulic energy into the mechanical energy.

In other words, when the four-quadrant radial piston hydraulic device is served as the hydraulic motor, flow direction of the high-pressure oil is: the pressure oil source→the high-pressure main port 32→the high-pressure ring groove 65→the first high-pressure oil-way 90→the corresponding second high-pressure oil cavity 52→the corresponding second low-pressure oil cavity 55→the first oil-way 92 of the plunger end cover→the second oil-way 91 of the plunger end cover→the plunger cavity 20→the second oil-way 91 of the plunger end cover→the third oil-way 94 of the plunger end cover→the second high-pressure oil-way 93 of the housing→the corresponding first high-pressure oil cavity 35→the low-pressure cavity 38→the low-pressure oil-way 107 of the housing→the low-pressure ring groove 66→the low-pressure main port 30.

As shown in FIG. 15 to FIG. 22, the embodiment of the present disclosure further provides a working method of the four-quadrant radial piston hydraulic device having two types of valves for flow distribution. Specifically, when the four-quadrant radial piston hydraulic device is served as a hydraulic pump, the high-pressure main port 32 is connected with a high-pressure oil tank or a hydraulic load. The high-pressure main port 30 is an oil outlet channel, the low-pressure main port is connected with an oil tank, and the low-pressure main port is an oil inlet channel. The embodiment takes one of the plunger assemblies 11 as an example for illustration.

When the reversing slide valve 101 is located on one side away from the compression spring 100, the high-pressure ring groove 65 is communicated with the second distribution ring groove 78, and the low-pressure ring groove 66 is communicated with the third distribution ring groove 77. The eccentric spindle 12 reversely rotates and drives the one of the plunger assemblies 11 to move downward from the topmost position. The volume of the corresponding plunger cavity 20 increases, and a vacuum is generated. A pressure in the corresponding plunger cavity 20 is lower than a pressure in the low-pressure oil tank. The low-pressure oil of low-pressure oil tank enters the second high-pressure oil-way 93 of the housing through the low-pressure main port 30, the low-pressure ring groove 66, the low-pressure oil-way 107 of the housing, the corresponding first low-pressure oil cavity 38 of a corresponding pilot-operated check valve, the corresponding first high-pressure oil cavity 35, and enters the corresponding plunger cavity 20 after passing through the third oil-way 94 of the plunger end cover and the second oil-way 91 of the plunger end cover.

The low-pressure oil pushes the one of the plunger assemblies 11 to move down until the one of the plunger assemblies 11 moves to the bottommost position. At this time, the eccentric spindle 12 drives the distribution shaft 6 to reversely rotate 180 degrees. The eccentric spindle 12 continues to reversely rotate, and the one of the plunger assemblies 11 begins to move upward. The volume of the corresponding plunger cavity 20 decreases, and the pressure thereof increases. The pressure of the corresponding plunger cavity 20 is greater than the pressure of the high-pressure oil tank or the hydraulic load. The oil in the corresponding plunger cavity 20 flows through the second oil-way 91 of the plunger end cover and the first oil-way 92 of the plunger end cover and enters the corresponding second low-pressure oil cavity 55. Then, the oil enters the first high-pressure oil-way 90 of the housing and the high-pressure ring groove 65 from the corresponding second high-pressure oil cavity 52. Then, the oil enters the high-pressure main port 32, and finally enters the high-pressure oil tank or the hydraulic load place, realizes the oil discharge movement of the one of the plunger assemblies 11. The plunger assemblies reciprocate to convert the mechanical energy into the hydraulic energy.

When the hydraulic pump forwardly rotates, the high-pressure oil is introduced into the control oil port 103. The high-pressure oil pushes the reversing slide valve 101 to move to one side close to the compression spring 100. After the reversing slide valve 101 moves to the limiting step 106, the reversing slide valve 101 is in a stable position. At this time, the high-pressure ring groove 65 is communicated with the first distribution ring groove 76, and the low-pressure ring groove 66 is communicated with the second distribution ring groove 78. The eccentric spindle 12 rotates forward and drives the one of the plunger assemblies 11 to move downward from the topmost position. The volume of the corresponding plunger cavity 20 increases, and the vacuum is generated. The pressure in the corresponding plunger cavity 20 is lower than the pressure in the low-pressure oil tank.

The oil in the low-pressure oil tank enters the second high-pressure oil-way 93 of the housing after passing through the low-pressure main port 30, the low-pressure ring groove 66, the low-pressure oil-way 107 of the housing, the corresponding first low-pressure oil cavity 38 of the corresponding pilot-operated check valve, and the corresponding first high-pressure oil cavity 35. Then, the oil flows through the third oil-way 94 and the second oil-way 91 of the plunger end cover and enters the corresponding plunger cavity 20. The oil in the corresponding plunger cavity 20 pushes the one of the plunger assemblies 11 to move down until the one of the plunger assemblies 11 moves to the bottommost position. At this time, the eccentric spindle 12 drives the distribution shaft 6 to forwardly rotate 180 degrees. The eccentric spindle 12 continues to forwardly rotate, and the one of the plunger assemblies 11 begins to move upward. The volume of the corresponding plunger cavity 20 decreases, and the pressure therein increases. The pressure in the corresponding plunger cavity 20 is greater than the pressure in the high-pressure oil tank or the hydraulic load. The oil in the corresponding plunger cavity 20 flows through the second oil-way 91 and the first oil-way 92 of the plunger end cover, and enters the corresponding second low-pressure oil cavity 55. Then, The oil enters the first high-pressure oil-way 90 and the high-pressure ring groove 65 of the housing from the corresponding second high-pressure oil cavity 52 again. Finally, the oil enters the high-pressure main port 32, and then enters the high-pressure oil tank or the hydraulic load, so as to realize the oil discharge movement of the one of the plunger assemblies 11. The plunger assemblies reciprocate to convert the mechanical energy into the hydraulic energy.

In other words, when the four-quadrant radial piston hydraulic device is served as the hydraulic pump, the flow direction of the oil is: the low-pressure oil tank→low-pressure main port 30→the low-pressure ring groove 66→the low-pressure oil-way 107 of the housing→the corresponding first low-pressure oil cavity 38→the corresponding first high-pressure oil cavity 35→the second high-pressure oil-way 93 of the housing→the third oil-way 94 of the plunger end cover→the second oil-way 91 of the plunger end cover→the corresponding plunger cavity 20→the second oil-way 91 of the plunger end cover→the first oil-way 92 of the plunger end cover→the corresponding second low-pressure oil cavity 55→the corresponding second high-pressure oil cavity 52→the first high-pressure oil-way 90 of the housing→the high-pressure ring groove 65→the high-pressure main port 32→the high-pressure oil tank or the hydraulic load.

The embodiment of the present disclosure adopts a dual valve flow distribution scheme, and the control oil-ways of the four-quadrant radial piston hydraulic device is simplified. At the same time, the four-quadrant radial piston hydraulic device realizes the two-way rotation as the hydraulic pump and the hydraulic motor, solves a problem that a conventional pilot-operated check valve or a conventional two-way cartridge valve distribution cannot realize the two-way rotation as the hydraulic pump and the hydraulic motor.

It should be understood that: the above is only preferred embodiments of the present disclosure, and the scope of protection of the present disclosure is not limited to the above embodiments, and all technical solutions under the idea of the present embodiments belong to the scope of protection of the present embodiments.

The above description of the drawings used in the embodiments shows only some embodiments of the present embodiments, which should not be regarded as a limitation of the scope, and for those skilled in the art, other relevant drawings can also be obtained from these drawings without creative labor.

What is claimed is:

1. A four-quadrant radial piston hydraulic device, comprising:

a housing;

plunger assemblies;

an eccentric spindle rotatably disposed on the housing;

pilot-operated check valves one-to-one corresponding to the plunger assemblies; and two-way cartridge valves one-to-one corresponding to the plunger assemblies;

wherein the housing defines plunger cavities, an eccentric spindle cavity, pilot-operated check valve cavities, two-way cartridge valve cavities, high-pressure oil-ways of the housing, low-pressure oil-ways, and control oil-ways therein; the pilot-operated check valve cavities and the two-way cartridge valve cavities respectively one-to-one correspond to the plunger assemblies; each of the plunger assemblies is slidably disposed in a corresponding plunger cavity along a vertical direction; the eccentric spindle is rotatably assembled in the eccentric spindle cavity, and is in transmission connection with the plunger assemblies;

wherein the four-quadrant radial piston hydraulic device further comprises a distribution shaft and a confluence plate; the distribution shaft is inserted into the eccentric spindle, and a reversing slide valve is disposed on the confluence plate;

wherein the distribution shaft defines a first distribution ring groove, a second distribution ring groove, and a third distribution ring groove thereon; the first distribution ring groove, the second distribution ring groove, and the third distribution ring groove are communicated with a high-pressure main port or a low-pressure main port; the distribution shaft defines a first distribution semi-ring groove, a second distribution semi-ring groove, a first oil hole, and a second oil hole thereon; the first oil hole is communicated with the second distribution semi-ring groove and the second distribution ring groove; the second oil hole is communicated with the first distribution semi-ring groove, the first distribution ring groove, and the third distribution ring groove;

wherein the confluence plate defines a high-pressure ring groove, a low-pressure ring groove, a reversing slide valve cavity, control oil-ways of the confluence plate, and the reversing slide valve thereon; the high-pressure ring groove defines a high-pressure ring groove hole thereon, and the low-pressure ring groove defines a low-pressure ring groove hole thereon; a first side of the reversing slide valve cavity is communicated with the high-pressure ring groove and the low-pressure ring groove respectively by the high-pressure ring groove hole and the low-pressure ring groove hole; a second side of the reversing slide valve cavity is communicated with the first distribution ring groove, the second distribution ring groove, and the third distribution ring groove; the reversing slide valve is inserted in the reversing slide valve cavity; the reversing slide valve is configured to enable the high-pressure ring groove to switch between being communicated with the first distribution ring groove and being communicated with the second distribution ring groove, and to enable the low-pressure ring groove to switch between being communicated with the second distribution ring groove and being communicated with the third distribution ring groove;

wherein each of the pilot-operated check valves is disposed in a corresponding pilot-operated check valve; each of the two-way cartridge valves is disposed in a corresponding two-way cartridge valve cavity; the pilot-operated check valves and the two-way cartridge valves are connected with the high-pressure oil-ways, the low-pressure oil-ways, and the control oil-ways of the housing; each of the pilot-operated check valves comprises a first control oil cavity, a first high-pressure oil cavity, and a first low-pressure oil cavity; each first high-pressure oil cavity is communicated with a corresponding plunger cavity; each first low-pressure oil cavity is communicated with the low-pressure ring groove; each first control oil cavity is alternately communicated with the first distribution semi-ring groove and the second distribution semi-ring groove; when each first control oil cavity and each first high-pressure oil cavity are subjected to high pressure simultaneously, each first high-pressure oil cavity is communicated with a corresponding first low-pressure oil cavity; each of the two-way cartridge valves comprises a second control oil cavity, a second high-pressure oil cavity, and a second low-pressure oil cavity; each second low-pressure oil cavity is communicated with a corresponding plunger cavity; each second high-pressure oil cavity is communicated with the high-pressure ring groove; each second control oil cavity is alternately communicated with the first distribution semi-ring groove and the second distribution semi-ring groove; when each second control oil cavity and each second high-pressure oil cavity are subjected to high pressure simultaneously, each second high-pressure oil cavity and each first low-pressure oil cavity are closed.

2. The four-quadrant radial piston hydraulic device according to claim 1, wherein the reversing slide valve comprises a valve spool; a first stop block, a second stop block, and a third stop block are disposed on the valve spool; a communicating groove is defined between each two adjacent stop blocks, and each communicating groove is configured to enable the high-pressure ring groove to switch between being communicated with the first distribution ring groove and being communicated with the second distribution ring groove when the valve spool slides, and to enable the low-pressure ring groove to switch between being communicated with the second distribution ring groove and being communicated with the third distribution ring groove.

3. The four-quadrant radial piston hydraulic device according to claim 2, wherein a limiting screw is disposed on a first end of the reversing slide valve close to a distribution shaft end cover, and the limiting screw is configured to stabilize the valve spool; a compression spring is disposed on a second end of the reversing slide valve, and the compression spring is connected with the valve spool.

4. The four-quadrant radial piston hydraulic device according to claim 1, wherein each of the pilot-operated check valves comprises a first valve body and a second valve body, and each second valve body is disposed in a corresponding first valve body; each first valve body defines a corresponding first control oil cavity therein; each second valve body defines a first movable cavity, a corresponding first high-pressure oil cavity and a corresponding first low-pressure oil cavity therein; a first valve core is movably installed in each first movable cavity; the first valve core is configured to control on-offs between each first high-pressure oil cavity and the corresponding first low-pressure oil cavity.

5. The four-quadrant radial piston hydraulic device according to claim 1, wherein each of the two-way cartridge valves comprises a third valve body, a fourth valve body, and a second valve core; a second high-pressure oil cavity and a second low-pressure oil cavity are disposed in each third valve body; a corresponding second control oil cavity is disposed in each fourth valve body; each second valve core is movably installed in a corresponding fourth valve body, and each second valve core is configured to control on-offs between each second high-pressure oil cavity and the corresponding second low-pressure oil cavity.

6. The four-quadrant radial piston hydraulic device according to claim 1, wherein the second oil hole is communicated with the first distribution semi-ring groove through a first distribution semi-ring groove hole; the second oil hole is communicated with the first distribution ring groove through a first distribution semi-ring groove hole; the first oil hole is communicated with the second distribution semi-ring groove through a second distribution semi-ring groove hole; the first oil hole is communicated with the second distribution ring groove through a second distribution ring groove hole; the second oil hole is communicated with the third distribution ring groove through a first distribution ring groove hole, and a third distribution ring groove hole.

7. The four-quadrant radial piston hydraulic device according to claim 1, wherein a first control oil-way of the housing, the first oil hole, and a second control oil-way of the housing are communicated, or, the first control oil-way of the housing, the second oil hole, and the second control oil-way of the housing are communicated.

8. A working method of the four-quadrant radial piston hydraulic device according to claim 1, comprising:

when the four-quadrant radial piston hydraulic device is configured as a hydraulic motor, connecting the high-pressure main port with a pressure oil source; wherein the high-pressure main port is an oil inlet channel, and the low-pressure main port is an oil outlet channel;

when the reversing slide valve is located at a first end of the reversing slide valve cavity and one of the plunger assemblies is located at a topmost position; introducing low-pressure oil into a corresponding second control oil cavity and a corresponding pilot-operated check valve cavity;

enabling the high-pressure oil to flow through the high-pressure main port, a corresponding second high-pressure oil cavity, and a corresponding second low-pressure oil cavity and enters a corresponding plunger cavity; wherein the high-pressure oil in the corresponding plunger cavity pushes a corresponding plunger to move downward, so that a volume of the corresponding plunger cavity increases, so as to drive the eccentric spindle to do positive circular motion until the one of the plunger assemblies reaches a bottommost position; when the one of the plunger assemblies is rotates from the topmost position to the bottommost position, the eccentric spindle and the distribution shaft forwardly rotate for 180 degrees, so that the high-pressure oil is introduced into the corresponding corresponding second control oil cavity and the corresponding pilot-operated check valve cavity;

under thrust of other plunger assemblies and an inertial force of the eccentric spindle, enabling the one of the plunger assemblies to move upward to reduce the volume of the corresponding plunger cavity; oil in the corresponding plunger cavity flows out from the low-pressure main port after passing through a corresponding first high-pressure oil cavity and a corresponding first low-pressure oil cavity, so as to realize periodic movement of the one of the plunger assemblies; reciprocating motion of the plunger assemblies causes the eccentric spindle to continuously output forward torque to convert hydraulic energy into mechanical energy;

when the reversing slide valve is located at a second end of the reversing slide valve cavity, enabling the high-pressure oil to flow through the high-pressure main port, a corresponding second high-pressure oil cavity, and a corresponding second low-pressure oil cavity and enters the corresponding plunger cavity; the high-pressure oil in the corresponding plunger cavity pushes the corresponding plunger to move downward to increase the volume of the corresponding plunger cavity, and drives the eccentric spindle to do reverse circular motion until the one of the plunger assemblies reaches the bottommost position; and after the eccentric spindle reversely rotates for 180 degrees, under the thrust of the other plunger assemblies and the inertial force of the eccentric spindle, enabling the one of the plunger assemblies to move upward to reduce the volume of the corresponding plunger cavity; the oil in the corresponding plunger cavity flows out from the low-pressure main port after passing through the corresponding first high-pressure oil cavity and the corresponding first low-pressure oil cavity, so as to realize the periodic movement of the one of the plunger assemblies; the reciprocating motion of the plunger assemblies causes the eccentric spindle to continuously output reverse torque to convert the hydraulic energy into the mechanical energy.

9. A working method of the four-quadrant radial piston hydraulic device according to claim 1, comprising:

when the four-quadrant radial piston hydraulic device is configured as a hydraulic pump, connecting the high-pressure main port with a high-pressure oil tank or a hydraulic load; wherein the high-pressure main port is an oil outlet channel, the low-pressure main port is connected with an oil tank, and the low-pressure main port is an oil inlet channel;

when the reversing slide valve is located at a first end of the reversing slide valve cavity, enabling the eccentric spindle to rotate in reverse to drive one of the plunger assemblies to move downward from a topmost position, so that a volume of a corresponding plunger cavity increases to generate a vacuum; wherein a pressure in the corresponding plunger cavity is lower than a pressure in a low-pressure oil tank; enabling oil in the low-pressure oil tank to flow into the corresponding plunger cavity through the low-pressure main port, a corresponding first low-pressure oil cavity, and a corresponding first high-pressure oil cavity until the one of the plunger assemblies moves to a bottommost position; wherein when the one of the plunger assemblies rotates from the topmost position to the bottommost position, the eccentric spindle drives the distribution shaft to reversely rotate 180 degrees;

enabling the eccentric spindle to continue to reversely rotate and drive the one of the plunger assemblies to move upward to reduce a volume of the corresponding plunger cavity and increase a pressure thereof; wherein the pressure in the corresponding plunger cavity is greater than a pressure in the high-pressure oil tank or the hydraulic load; the oil in the corresponding plunger cavity flows through a corresponding second low-pressure oil cavity and a corresponding second high-pressure oil cavity and enters the high-pressure oil tank or the hydraulic load to realize an oil discharge movement of the one of the plunger assemblies; through a reverse rotation of the eccentric spindle, low-pressure oil is sucked into each of the plunger cavities, is converted into high-pressure oil, and is discharged, so mechanical energy is converted into hydraulic energy; and when the reversing slide valve is located at a second end of the reversing slide valve cavity, enabling the eccentric spindle to rotate forward to drive the one of the plunger assemblies to move downward from the topmost position, so that the volume of the corresponding plunger cavity increases, and the vacuum is generated; wherein the pressure in the corresponding plunger cavity is lower than the pressure in the low-pressure oil tank; the oil in the low-pressure oil tank flows into the corresponding plunger cavity through the low-pressure main port, the corresponding first low-pressure oil cavity, and the corresponding first high-pressure oil cavity until the one of the plunger assemblies moves to the bottommost position; during this process the eccentric spindle drives the distribution shaft to forwardly rotate 180 degrees; and enabling the eccentric spindle to continue to rotate forward, so the one of the plunger assemblies moves upward to reduce the volume of the corresponding plunger cavity and increase the pressure thereof; wherein the pressure in the corresponding plunger cavity is greater than the pressure in the high-pressure oil tank or the hydraulic load; the oil in the corresponding plunger cavity flows through the corresponding second low-pressure oil cavity and the corresponding second high-pressure oil cavity and enters the high-pressure oil tank or the hydraulic load to realize the oil discharge movement of the one of the plunger assemblies; through a forward rotation of the eccentric spindle, the plunger assemblies are driven to suck the low-pressure oil into each of the plunger cavities, and the low-pressure oil is then converted into the high-pressure oil and is discharged, so that the mechanical energy is converted into the hydraulic energy.

* * * * *